United States Patent [19]
Kirkbride

[11] 3,861,737
[45] Jan. 21, 1975

[54] POWER CARRIER FOR TARPS AND TOPS OF OPEN-TOP TRUCKS AND TRAILERS

[76] Inventor: William W. Kirkbride, 14198 Syracuse Ave., Taylor, Mich. 48180

[22] Filed: Oct. 4, 1973

[21] Appl. No.: 403,506

[52] U.S. Cl............ 296/100, 296/137 B, 105/377, 49/197
[51] Int. Cl..................... B60p 7/02, B61d 39/00
[58] Field of Search .......... 296/100, 101, 116, 117, 296/137 B; 105/377; 220/29, 36; 49/107, 108, 197, 200

[56] References Cited
UNITED STATES PATENTS

| | | | |
|---|---|---|---|
| 191,105 | 5/1877 | Buettler et al. | 49/108 |
| 296,809 | 4/1884 | Wyman | 105/377 |
| 2,408,132 | 9/1946 | Weeks | 296/137 B |
| 2,877,722 | 3/1959 | Peat | 105/377 |
| 2,979,361 | 4/1961 | Eppinger et al. | 296/100 |
| 3,132,600 | 5/1964 | Allard | 105/377 |
| 3,169,492 | 2/1965 | Stiefel et al. | 105/377 |

FOREIGN PATENTS OR APPLICATIONS

| | | | |
|---|---|---|---|
| 28,843 | 10/1907 | Great Britain | 296/100 |

Primary Examiner—M. Henson Wood, Jr.
Assistant Examiner—Robert Saifer
Attorney, Agent, or Firm—Cullen, Settle, Sloman & Cantor

[57] ABSTRACT

A power carrier for tarpaulins and tops of open-top trucks and trailers includes a pair of elongated cover halves. These cover halves are adapted to register over the side and end rails of the vehicle meeting centrally and longitudinally of the open-top thereof. The cover halves when closed are anchored at their outer longitudinal edge portions to the vehicle box side rails. A pair of U-shaped oppositely arranged carriers extend the length of the vehicle and outwardly of the ends thereof with end portions of the carriers pivotally journalled and mounted upon the vehicle box end rails. The carriers intermediate their ends are pivotally connected to the cover halves. A power device is mounted upon the end rail and are drivingly connected to both carriers to simultaneously move the same from a rest open position with the cover halves retracted to a closed position with cover halves in sealing registry over the box open top.

7 Claims, 7 Drawing Figures

1

POWER CARRIER FOR TARPS AND TOPS OF OPEN-TOP TRUCKS AND TRAILERS

BACKGROUND OF THE INVENTION

Heretofore, various efforts have been made in providing coverings for trucks and open-top trailers and, wherein very involved mechanism has been employed to provide a canopy or other tarpaulin or covering therefore. Examples of such earlier efforts are found in U.S. Patent Office Class 296, Subclasses 100, 101, 116, 117 and 137 including the following U.S. Pat. Nos.

2,346,554
3,544,156
3,168,345
3,179,464
3,656,802
3,549,198
2,807,499
3,514,152
3,338,623
3,310,338
3,549,199

These devices are impractical and complicated as distinguished with the present simplified power means for protectively covering the open top of a truck, trailer or similar vehicle.

BRIEF DESCRIPTION OF THE INVENTION

It is an object of the present invention to provide a power carrier for a tarpaulin or a top, rigid or semi-rigid, for trucks and trailers which include a pair of cover halves which are adapted to register over the side rails of such trailer, anchored in such a fashion as to be capable of moving from a stored position retracted to one side of the vehicle to a protective enclosing position meeting at the center along the longitudinal axis of the open box.

It is another object to provide a power means by which the tarpaulin or cover halves may be moved manually or by power from such retracted position to closing position with the cover halves meeting longitudinally in sealed relation throughout the length of the vehicle body.

It is another object to provide suitable counterbalance and anchoring means by which the cover halves may be snugly positioned over the open top of the truck or trailer, may be stored in retracted position against the sides thereof and wherein, the counterbalancing means assists in the initial movements towards closed position.

It is a further object to provide a very simplified mechanism by which a pair of flexible or non-flexible cover halves may be moved from a retracted position along the sides of the vehicle so as to overlie and register along the longitudinal axis of the open top for protectively enclosing the same, and may be likewise retracted.

These and other objects will be seen from the following specification and claims in conjunction with the appended drawings in which:

It will be understood that the above drawings illustrate merely a preferred embodiment of the invention, and that other embodiments are contemplated within the scope of the claims hereafter set forth.

DETAILED DESCRIPTION OF THE INVENTION

Figure 1:
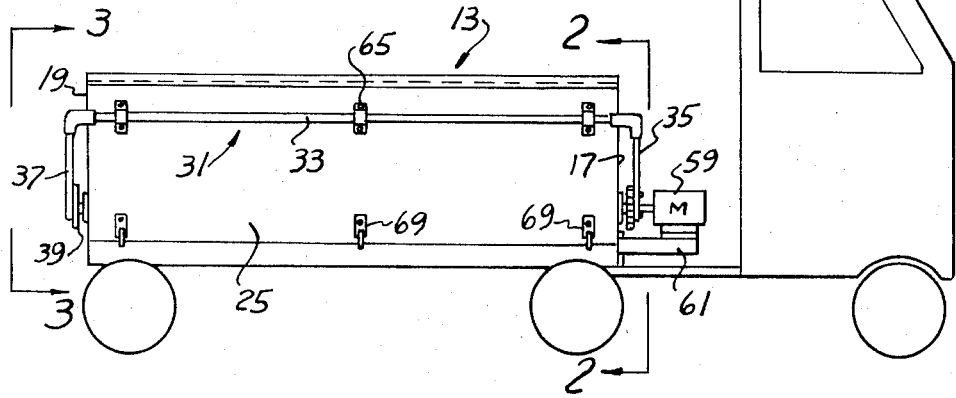
FIG. 1 is a side elevational view of an open-top trailer with the cover halves retracted.
Figure 2:
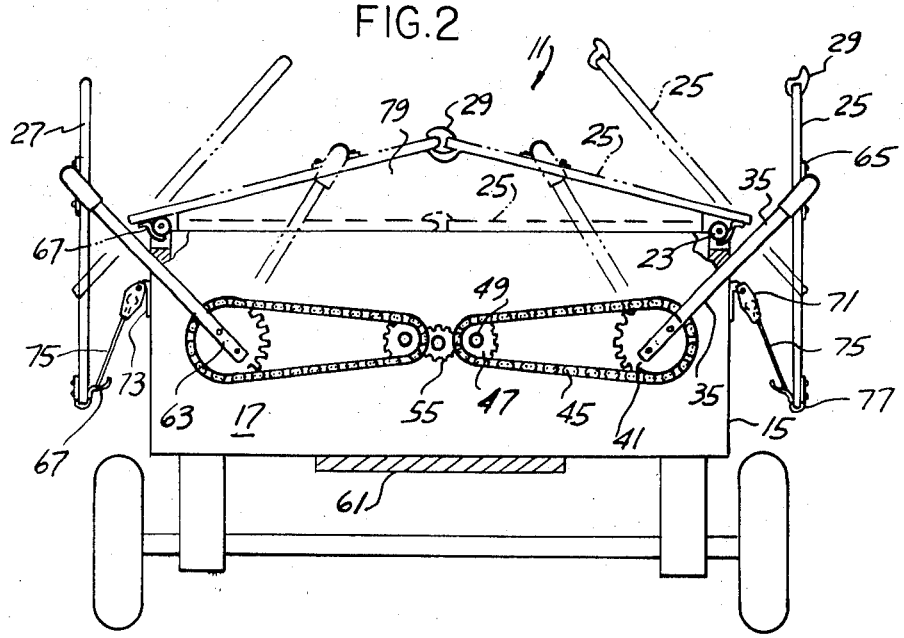
FIG. 2 is a fragmentary section taken in the direction of arrows 2—2 of FIG. 1, on an increased scale.
Figure 3:
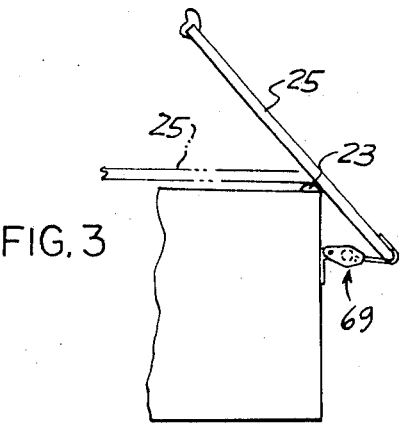
FIG. 3 is a fragmentary view taken in the direction of arrows 3—3 of FIG. 1, showing one of the cover halves in an intermediate position.
Figure 4:
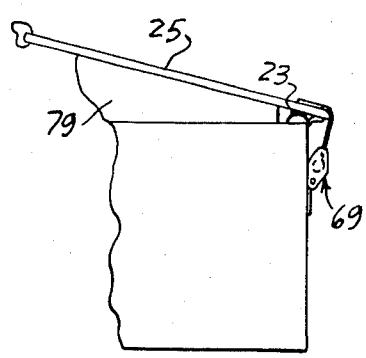
FIG. 4 is a similar view showing one of the cover halves in a partially closed position.

Referring to the drawings, the present power operated open-top carrier is generally indicated at 11, FIG. 2, adapted for use on a trailer 13, FIG. 1, an open-top truck or similar vehicle whose body includes upright side rails 15, front end wall 17, and rear end wall 19.

Along the top edges of the side walls 15 are the side rails 21. A series of longitudinally spaced rollers 23 are mounted on said rails adapted for cooperative guided registry with the cover halves 25 and 27 as they are moved from the solid line retracted rest position at the sides of the vehicle to the covering position as shown in dash lines progressively in FIG. 2.

These rollers serve as guides for the movement of the cover halves between the two positions and at the same time protect the top rail of the truck box.

Each cover half, 25 and 27, is in the form of a framework capable of supporting a skin. The skin can be of any suitable material, hard or soft. Hard material may be aluminum, steel and so forth. Soft material may be canvas, plastic sheets or the like. The inner edges of the cover halves meeting at the center of the truck box when closed are made water-tight by either male-female edges, weather strips, interlock or by overlapping inner edges. In one form shown in FIG. 2, the inner marginal edge of the cover half 27 is adapted to cooperatively nest within an undercut recess in the elongated seal 29 on the corresponding outer edge of the other cover half 25. Various forms of seal may be employed.

The power carrier for controlling opening and closing of the cover halves is generally indicated at 31, FIG. 1, and is of U-shape. Elongated central portion includes shaft 33 which extends beyond the length of the open box of the trailer or truck and terminates at one end in the right angularly related drive arm 35 and at its opposite end in the pivot arm 37 whose inner end is journalled at 39 upon rear wall 19.

Figure 6:
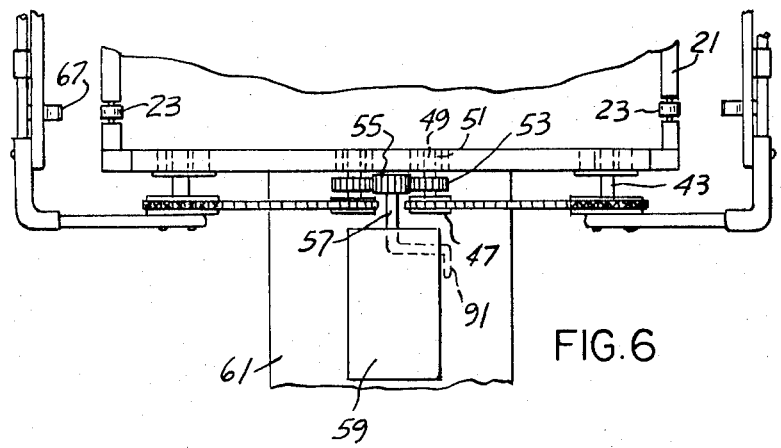
FIG. 6 is a fragmentary plan view of the forward portion of the open top trailer showing the power mechanism for controlling opening and closing of the cover halves.

Referring to FIG. 2, driven sprocket 41 is supported upon journal shaft 43, FIG. 6, in longitudinal registry with the journal 39, FIG. 1. Sprocket chain 45 interconnects driven sprocket 41 with drive sprocket 47 on idler shaft 49 journalled at 51 upon front wall 17.

Driven gear 53 on shaft 49 is in mesh with drive gear 55 on drive shaft 57 corresponding to the output of motor 59. Said motor may be electric or other form of engine or motor capable of driving shaft 57, first in one direction and then in the opposite direction. Equivalent transmission means may be employed including pulleys and belts and gearing.

Figure 5:
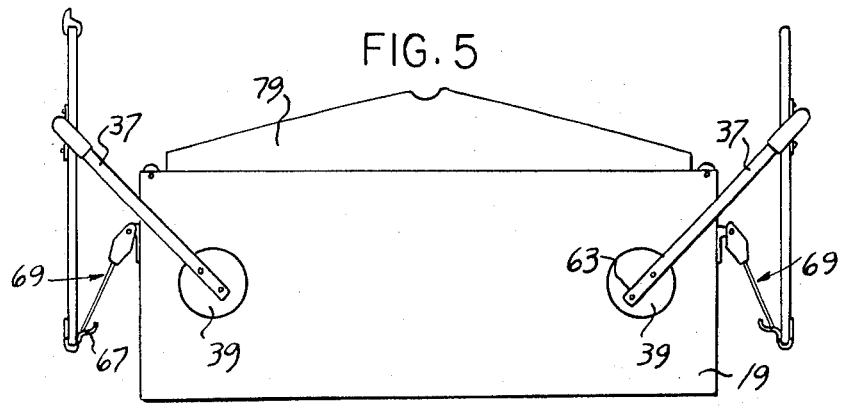
FIG. 5 is an end view taken in the direction of arrows 3—3 of FIG. 1 with the cover halves retracted.

The motor is mounted upon support 61, FIGS. 1 and 6, at and adjacent front wall 17. Driven gears 53 are on opposite sides of drive gear 55. Each controls a corresponding drive sprocket 47 in a symmetrical construction of the carrier mechanism. The cover halves are adapted to move from the retracted solid line position shown in FIG. 2 through the intermediate positions and to the closed position shown, slightly inclined or horizontally disposed as shown in dash lines. The respective drive arms 35 which form a part of the U-shape carriers at their inner ends are anchored to the respective sprockets 41 as at 63. A similar anchor is shown in FIG. 5 for pivot arms 37.

Suitable means are employed for pivotally connecting the elongated shaft 33 to the respective cover halves such as shown in FIG. 1. For this purpose in the illustrative embodiment there are provided a series of longitudinally spaced journal brackets 65 anchored to the respective cover halves, such as the cover half 25, FIG. 1. On power operation of the respective sprockets 41 the cover halves translate from the upright retracted position shown in FIG. 2 through intermediate positions moving over the guide rollers 23 to the protective covering position shown in dash lines.

In FIG. 2 the cover halves in their spacing with respect to the side walls of the vehicle are exaggerated merely for clarity of illustration. It is contemplated that in normal operation, these cover halves would be reasonably close and adjacent to the vehicle side walls when retracted.

In the illustrative embodiment, the shafts 33 forming a part of the U-shaped carriers are pivotally connected by the brackets 65 to the respective cover halves. It is contemplated that the cover halves as a framework could pivotally receive the shafts 33 enclosing them to function in the same manner as described and shown specifically with respect to FIG. 2.

An auxiliary support 79 of which there would be two or more if desired, extend across the open top of the box as shown in FIGS. 2 and 5 adapted to supportably receive the cover halves rotated to a closed position. These auxiliary supports are not required in all situations. In fact, in many situations, no auxiliary supports 79 will be provided. In that case, the cover halves will be positioned transversely across the open top in the dotted line position shown in FIG. 2 rather than inclined resting upon supports 79.

Along the outer longitudinal edges of each of the cover halves 25 and 27 there is provided a series of roller lock brackets 67. When the cover halves have moved to the approximate closed position shown in FIG. 2, these brackets cooperatively and retainingly register with under surface portions of the respective rollers 23 along the top rails serving to anchor the cover halves at their outer margins and with respect to the side rail of the open top.

With or without the roller lock bracket 67, the present power carrier provides a means for anchoring the free outer edges of the cover halves 25 and 27 in the provision of a series of counter-balance assemblies 69, FIGS. 1 through 5.

A series of these counter-balance mechanisms are mounted upon and along the side rails 15 adjacent the top areas thereof and may include for illustration, a conventional type of reel 71 which includes a spring biased elongated strap 74 whose free end extends around and is anchored as at 77 to outer lower edge portions of the cover halves as shown in FIG. 2.

These counter-balances act as hold downs with the tops in closed position. With the tops slid over the rails and down the sides of the truck, FIG. 2, the counter-balances will carry more and more weight, until when fully open, most of the weight is held by them.

The counter-balance can be of many types. On small units, simple rubber hold downs that will stretch and hold the weight will sometimes be satisfactory. On heavy units, more complex types can be used. Examples of these may be spring, ribbon and retractor types. Type and tension needed will be the determining needs and many factors such as weight size and use of the particular unit will determine the type of the counter-balance to be employed.

The present carrier will work well with many types of counter-balances in use at the present time on the market.

Figure 7:
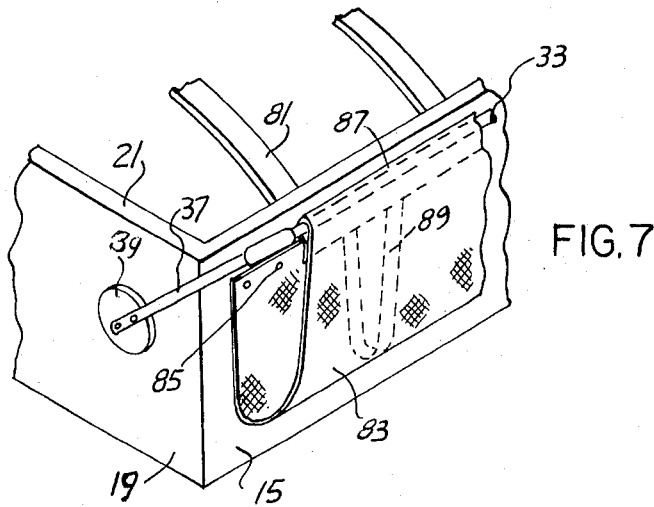
FIG. 7 is a fragmentary perspective view taken from the rear of a trailer or truck which employs flexible tarpaulin-like cover halves.

Some form of counter-balance may be employed with tarps such as the tarp half shown at 83, FIG. 7. These are flexible and may be anchored by snaps or otherwise at 85 to upper portions of the vehicle side walls 15. These may be held down by resilient straps or by a counter-balance such as shown at 69, 71, 75, 77, FIG. 2.

In the fragmentary illustration, FIG. 7, the tarp when retracted is folded and has a longitudinally extending loop 87 at its other free edge which receives elongated shaft 33 of carrier 31 shown in FIG. 1. In this illustration, the truck or vehicle open top has a series of longitudinally spaced bows 81 for supporting the tarpaulin halves when closed. Alternately, flexible bows 89 may be sewn into the tarpaulin to serve as stiffeners instead of bows 81 upon the vehicle between the side rails.

In the present construction, the pivot points 43 for the drive arms 35 as well as the pivot points 39 for the pivot arms are arranged slightly less than one quarter of the width inward from the side rails of the open box. The arc of the carrier shaft 33 will be from the center of the truck to just outside the top side rail 21 which is shown exaggerated in FIGS. 2 and 6 for clarity.

The basic carrier unit has a power assembly driving the twin carriers 31 for positioning the twin half tops 25–27, FIG. 2, or half tarps 83, FIG. 7. In very small constructions, instead of motor 59, there may be merely a crank handle 91, FIG. 6, suitably connected with the output shaft 57 as the power means for rotating gears 55, 53 and sprockets 47 and 41 for simultaneously opening and closing the cover halves. It is preferred that the power means be a motor such as shown at 59, FIG. 1.

The present invention employs a pair of oppositely arranged pivotally mounted U-shaped carriers 31 whose central bight is adapted to pivotally engage portions of a cover half throughout its length. One edge portion of the cover half is yieldably, flexibly or otherwise anchored or guidably mounted over the vehicle side rail biased downwardly as by the counter-balancing mechanism 69, FIG. 2 and FIG. 3. Said cover halves may be anchored by anchor brackets 67 with respect to the guide and support rollers 23 on the side rails.

From open to closed position or from closed to open position, the cycle will generally take less than six seconds when power operated, employing the motor 59, FIG. 1. The time will depend upon the size and weight of the unit and upon the power assembly used.

With the cover halves in the open retracted position, FIG. 2, and with the straps 75 of the counter-balances biased inwardly, it appears that said straps are under tension supporting the larger portion of the load of the cover tops. Therefore, upon activation of the motor or if manually operated, the counter-balances will assist in the initial lifting movement of the cover halves from the open position shown in FIG. 1 to the dashed line closed position.

The time is given to allow for comparison to manually handling of tarps and tie downs which can take as much as one half to a full hour or more. Although this unit is developed to operate satisfactorarily with the power of a 12 volt reversible motor, other power sources could be employed.

Power units can have a manual back up and small units may be worked manually such as by the crank 91, FIG. 6.

Reversatility of the present unit is in the use of the numerous types of tops and covers. It will operate sectional half tops without the need of tracks or cables. The present unit will work on various types of open top vehicles and units including cargo rigs, dump trucks, trailers or open top trucks.

Having described my invention, reference should now be had to the following claims.

I claim:

1. A power carrier for tarps and tops of open-top trucks and trailer vehicles having side and end rails comprising:
    a pair of elongated cover halves adapted to register over said rails meeting centrally and longitudinally over said open top;
    means anchoring the outer longitudinal edge portions of said cover halves to the side rails;
    a pair of U-shaped carriers extending the length of said vehicle outwardly of the side rails with their ends extending over, outwardly of and pivoted upon said end rails;
    central portions of said carriers being pivotally connected to said cover halves;
    and power means connected to said carriers to simultaneously rotate said carriers from a rest position with said cover halves retracted uncovering said open top, to a closed position with said cover halves in cooperative registry overlying and closing said open top.

2. In the power carrier of claim 1, said power means including rotatable driven means secured to the one ends of said carriers; rotatable drive means connected to said driven means; and a common rotatable driven shaft operably connected to said drive means for rotation thereof in unison and in opposite directions.

3. In the power carrier of claim 1, the anchoring of the outer edge portions of said cover halves being yieldable.

4. In the power carrier of claim 1, said cover halves being flexible in the form of a tarpaulin, there being a series of flexible longitudinally spaced support bows connected into said cover halves for reinforcement thereof.

5. In the power carrier of claim 2, said power means including a reversable motor connected to said driven shaft.

6. In the power carrier of claim 1, the anchoring means comprising a series of spaced counter-balance devices secured along said side rails including a resilient retractable strap yieldably and supportably engaging outer edge portions of said cover halves when they are retracted and adapted to assist in inward closing movements of the cover halves.

7. In the power carrier of claim 6, a series of longitudinally spaced rollers upon and along the top of said side rails guidably engaging said cover halves during opening and closing movements; and a corresponding series of arcuate anchor brackets upon and along the outer edges of said cover halves retainingly engaging said rollers respectively when the cover halves are in closed position.

* * * * *